(12) United States Patent
Duris et al.

(10) Patent No.: US 12,423,678 B2
(45) Date of Patent: Sep. 23, 2025

(54) METHOD AND SYSTEM FOR AUTHORIZATION FOR CRYPTOCURRENCY ON DISTRIBUTED LEDGER

(71) Applicant: MASTERCARD INTERNATIONAL INCORPORATED, Purchase, NY (US)

(72) Inventors: Oskar Duris, Walnut Creek, CA (US); Jamal Khan, Ridgefield, NJ (US); Noah Tavares, Burlingame, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 167 days.

(21) Appl. No.: 17/749,980

(22) Filed: May 20, 2022

(65) Prior Publication Data

US 2023/0376940 A1 Nov. 23, 2023

(51) Int. Cl.
*G06Q 20/36* (2012.01)
*G06Q 20/06* (2012.01)
(Continued)

(52) U.S. Cl.
CPC ....... *G06Q 20/3674* (2013.01); *G06Q 20/065* (2013.01); *G06Q 20/3678* (2013.01);
(Continued)

(58) Field of Classification Search
CPC .. H04L 9/0637; G06Q 20/382; G06Q 20/065; G06Q 20/36; G06F 21/64
See application file for complete search history.

(56) References Cited

U.S. PATENT DOCUMENTS

| 2015/0262140 A1 | 9/2015 | Armstrong |
| 2015/0324789 A1 | 11/2015 | Dvorak et al. |

(Continued)

FOREIGN PATENT DOCUMENTS

| KR | 20190132159 A | 11/2019 |
| WO | 2017213943 A1 | 12/2017 |

OTHER PUBLICATIONS

Notification of Transmittal of the International Search Report and the Written Opinion of the International Search Authority, or the Declaration, dated Jul. 31, 2023, issued in corresponding International Application No. PCT/US2023/018029, 10 pgs.

*Primary Examiner* — Saba Dagnew
(74) *Attorney, Agent, or Firm* — Panitch Schwarze Belisario & Nadel LLP

(57) ABSTRACT

A method for enabling real-time authorization of a transaction with pooled equity includes: receiving a transaction request message, the transaction request message including at least a public key of a cryptographic key pair and a transacting currency amount; verifying a balance of a cryptographic currency for a first blockchain wallet associated with the cryptographic key pair on a blockchain using at least the public key, where at least a portion of the balance is locked in a currency pool; generating a smart contract, the smart contract configured to initiate a first blockchain transaction on the blockchain for transfer of the transacting currency amount from a second blockchain wallet to a destination address, where the second blockchain wallet is different from the first blockchain wallet; and transmitting the generated smart contract to a node in a blockchain network associated with the blockchain for publishing to the blockchain.

16 Claims, 5 Drawing Sheets

(51) Int. Cl.
*G06Q 20/38* (2012.01)
*G06Q 20/40* (2012.01)
*H04L 9/00* (2022.01)
*H04L 9/08* (2006.01)

(52) U.S. Cl.
CPC ....... *G06Q 20/381* (2013.01); *G06Q 20/3829* (2013.01); *G06Q 20/403* (2013.01); *H04L 9/0825* (2013.01); *H04L 9/50* (2022.05); *G06Q 2220/00* (2013.01); *H04L 2209/56* (2013.01)

(56) References Cited

U.S. PATENT DOCUMENTS

| | | | |
|---|---|---|---|
| 2017/0085545 A1 | 3/2017 | Lohe et al. | |
| 2019/0130399 A1* | 5/2019 | Wright | G06Q 20/401 |
| 2019/0156303 A1* | 5/2019 | Shtylman | G06Q 20/382 |
| 2019/0164157 A1* | 5/2019 | Balaraman | G06Q 20/36 |
| 2020/0005293 A1* | 1/2020 | Opeola | G06Q 20/065 |
| 2021/0073913 A1* | 3/2021 | Ingargiola | G06F 21/64 |
| 2022/0261882 A1* | 8/2022 | Youb | G06Q 50/16 |

* cited by examiner

METHOD AND SYSTEM FOR AUTHORIZATION FOR CRYPTOCURRENCY ON DISTRIBUTED LEDGER

FIELD

The present disclosure relates to authorizing cryptocurrency transactions on blockchains or other distributed ledgers, specifically enabling real-time authorization for a transaction where the payer wants to use pooled equity.

BACKGROUND

In recent years, blockchain has seen significantly increased usage across a variety of industries, particularly in the distribution and spending of cryptographic currencies, also referred to as cryptocurrencies. Consumers are now able to transact for a wide variety of goods and services using a vast number of cryptocurrencies, many of which can be converted to or from widely available fiat currencies.

As part of the increasing use and market value of cryptocurrencies, a large industry has arisen for the trading of cryptocurrency, similar to the trading of more traditional commodities. One feature that enables cryptocurrency trading is the use of liquidity pools. A liquidity pool is a pool of tokens, which represent cryptocurrency, that are locked in place through a smart contract. Users are able to perform trades based on the liquidity they have locked in the pool, where a liquidity provider or other entity that manages or is otherwise associated with the pool collects fees on trades using liquidity locked in the pool.

For a consumer interested in trading, a liquidity pool can be beneficial and convenient. However, if the consumer wants to make use of their liquidity for a purchase of goods or services, and not for trading, they are extremely limited due to the currency being locked in the liquidity pool. Current methods for transacting using pooled equity force a consumer to wait until the equity is unlocked, which can be detrimentally inconvenient, or manually borrowing unlocked currency using their pooled equity, which can be a time consuming process, difficult for less advanced consumers, and also presents an amount of risk to the consumer's equity. Thus, there is a need for a technical advancement that can enable a consumer to safely transact, in real-time, using pooled equity.

SUMMARY

The present disclosure provides a description of systems and methods for enabling real-time authorization of a transaction with pooled equity. A consumer interested in using pooled equity for a transaction submits a transaction request to an inquisitor system, which can verify the consumer's blockchain wallet and its ownership of a suitable amount of cryptocurrency. The inquisitor system identifies a liquidity provider that is interested in assisting the consumer and provides details regarding the consumer's pooled equity and interested transaction to the liquidity provider. The liquidity provider generates a smart contract that is published to a relevant blockchain or other distributed ledger that will use the liquidity provider's own unlocked equity to accomplish the desired transaction in real-time and transfer the consumer's pooled equity to the liquidity provider once it is available. Thus, the consumer can quickly and easily perform a transaction in real-time using their pooled equity without having to wait for exit times, borrow against their equity, or perform time-consuming, difficult actions. As a result, pooled equity can be used by consumers more easily and with greater convenience than with traditional methods.

A method for enabling real-time authorization of a transaction with pooled equity includes: receiving, by a receiving device, a transaction request message, the transaction request message including at least a public key of a cryptographic key pair and a transacting currency amount; verifying, by a verification module, a balance of a cryptographic currency for a first blockchain wallet associated with the cryptographic key pair on a blockchain using at least the public key, where at least a portion of the balance is locked in a currency pool; generating, by a generation module, a smart contract, the smart contract configured to initiate a first blockchain transaction on the blockchain for transfer of the transacting currency amount from a second blockchain wallet to a destination address, where the second blockchain wallet is different from the first blockchain wallet; and transmitting, by a transmitting device, the generated smart contract to a node in a blockchain network associated with the blockchain for publishing to the blockchain.

A system for enabling real-time authorization of a transaction with pooled equity includes: a blockchain network including one or more nodes; a receiving device receiving a transaction request message, the transaction request message including at least a public key of a cryptographic key pair and a transacting currency amount; a verification module verifying a balance of a cryptographic currency for a first blockchain wallet associated with the cryptographic key pair on a blockchain associated with the blockchain network using at least the public key, where at least a portion of the balance is locked in a currency pool; a generation module generating a smart contract, the smart contract configured to initiate a first blockchain transaction on the blockchain for transfer of the transacting currency amount from a second blockchain wallet to a destination address, where the second blockchain wallet is different from the first blockchain wallet; and a transmitting device transmitting the generated smart contract to the node in the blockchain network for publishing to the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided

DETAILED DESCRIPTION

System for Real-Time Authorization of Transactions Using Pooled Equity

Figure 1:
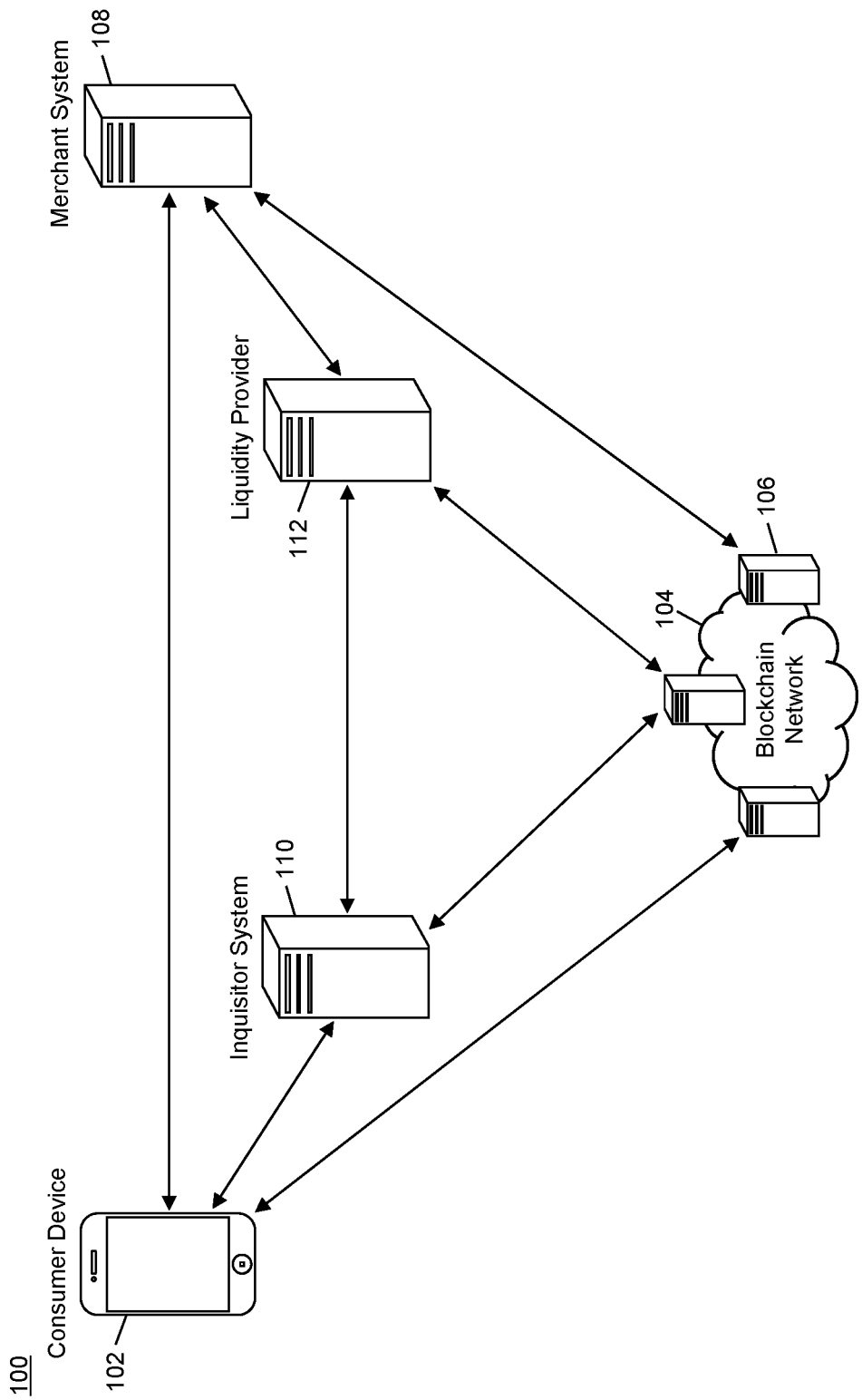
FIG. 1 is a block diagram illustrating a high level system architecture for enabling real-time authorization of a transaction with pooled equity in accordance with exemplary embodiments.

FIG. 1 illustrates a system 100 for the processing of blockchain transactions in real-time for consumers wishing to use cryptographic currency that is locked in a liquidity pool.

The system 100 can include a consumer device 102. The consumer device 102 can be any type of computing device, such as those illustrated in FIGS. 2 and 5 and discussed in more detail below, that can operate as a blockchain wallet to store the cryptographic keys necessary for the ownership and transfer of cryptocurrency on a blockchain. The consumer device 102 can be, for example, a desktop computer, a laptop computer, a notebook computer, a tablet computer, a cellular phone, a smart phone, a smart television, a smart watch, a wearable computing device, an implantable computing device, etc.

Figure 2:
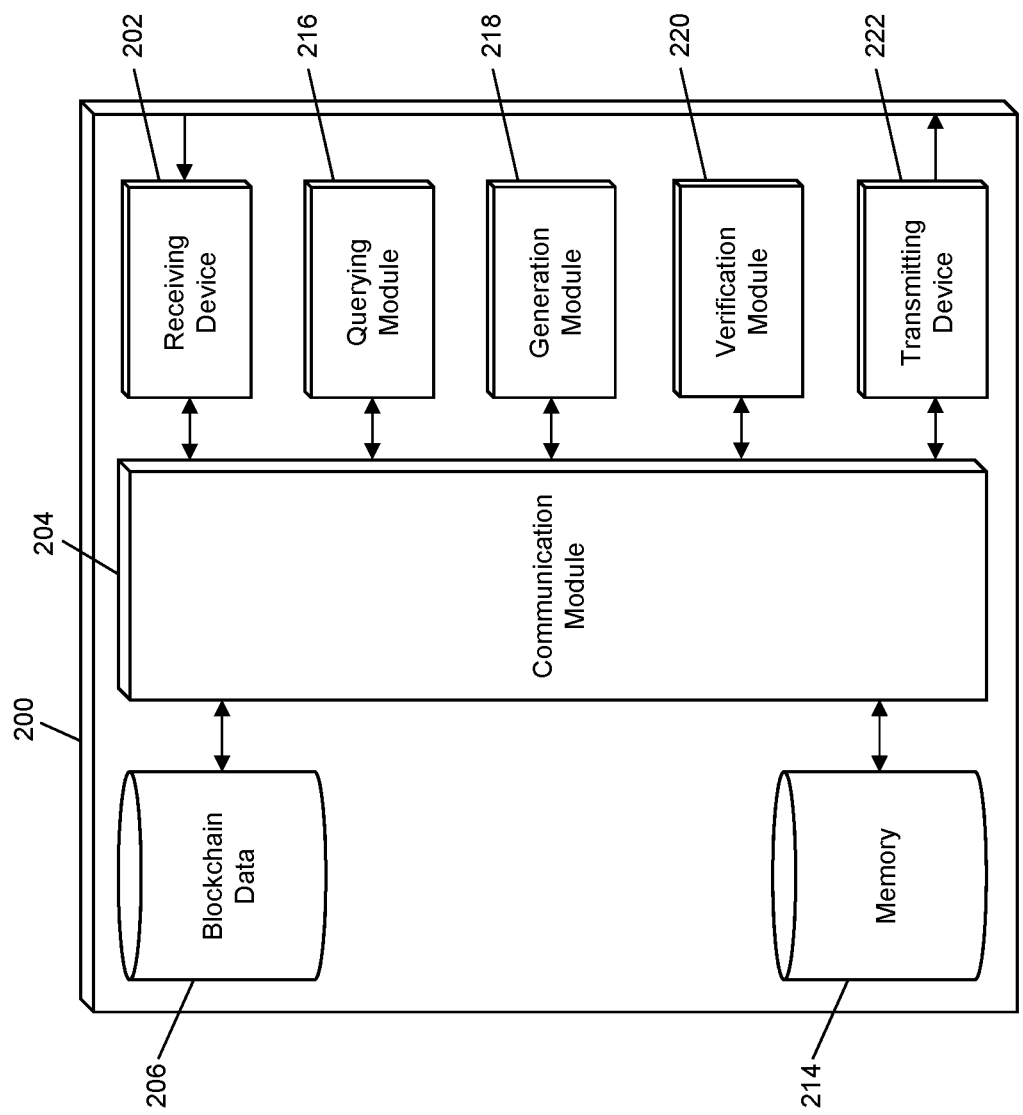
FIG. 2 is a block diagram illustrating a computing system in the system of FIG. 1 for enabling and processing real-time authorized transactions using pooled equity in accordance with exemplary embodiments.
Figure 5:
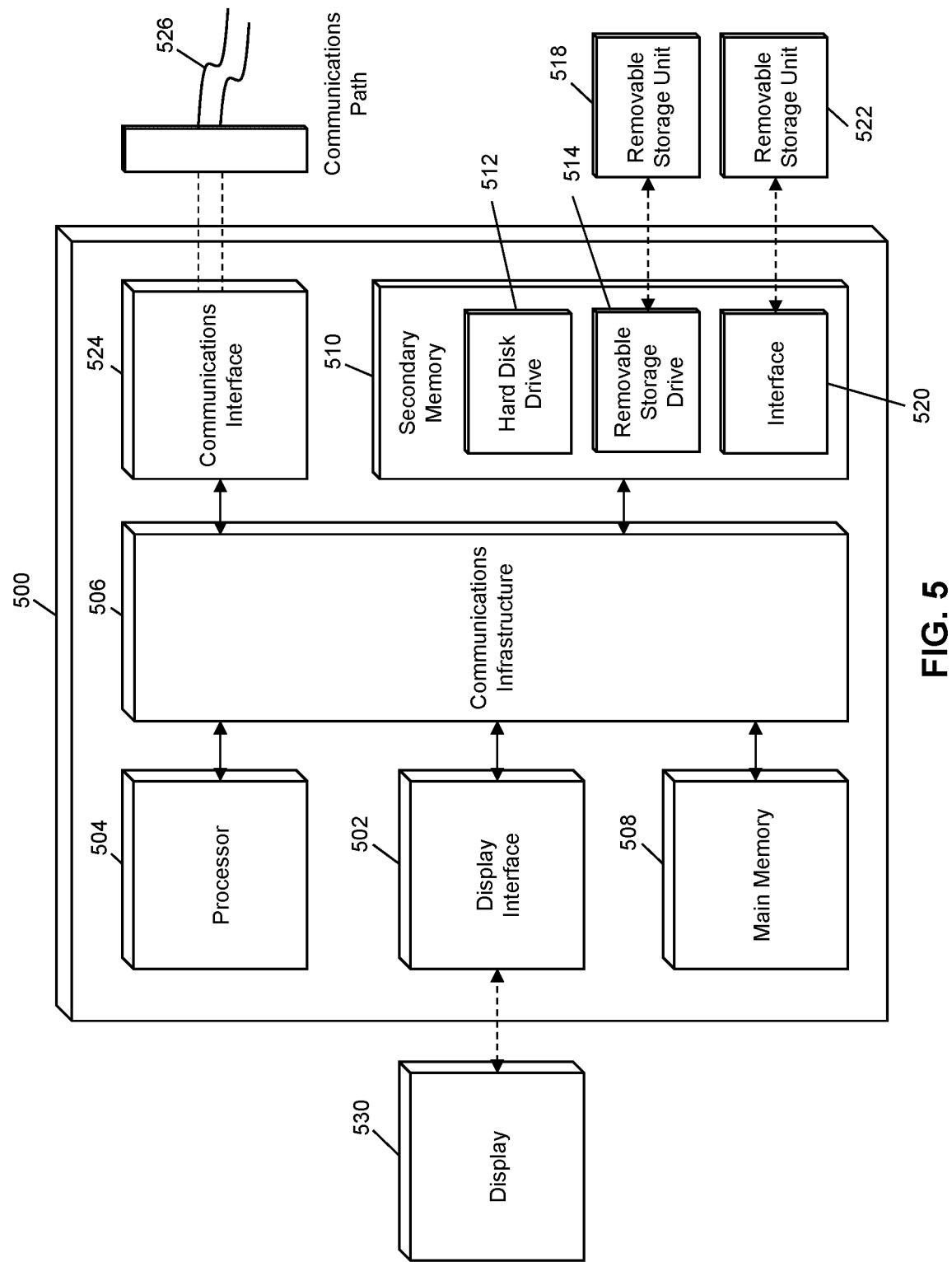
FIG. 5 is a block diagram illustrating a computer system architecture in accordance with exemplary embodiments.

The system 100 can also include a blockchain network 104. The blockchain network 104 can be comprised of a plurality of blockchain nodes 106. Each blockchain node 106 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated, and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in the blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" can refer specifically to the private key. In other cases, the term "blockchain wallet" can refer to a computing device (e.g., consumer device 102, etc.) that stores the private key for use thereof in blockchain transactions. For instance, each computing device can each have their own private key for respective cryptographic key pairs, and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a consumer device 102) that is generated using the sender's private key, a blockchain address of the recipient of currency (e.g., a merchant system 108) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 104 in the blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain wallet of the computing device (herein also referred to directly as the consumer device 102) can have ownership of cryptocurrency on the blockchain associated with the blockchain network 104, which can be utilize in future blockchain transactions by the consumer device 102 using traditional methods and systems. In an exemplary embodiment, at least a portion of the cryptocurrency owned by the consumer device 102 can be locked in a liquidity pool, also referred to herein as a currency pool. The user of the consumer device 102 can be interested in making a transaction with a merchant associated with a merchant system 108 for the purchase of goods or services using the cryptocurrency. If the transaction requires an amount of currency greater than an amount available to the consumer device 102 that is not locked in the pool, then the consumer device 102 can utilize the processes discussed herein for a real-time transaction with the merchant system 108 leveraging their locked cryptocurrency.

The consumer device 102 can electronically transmit a transaction request message to an inquisitor system 110 using a suitable communication network and method, such as via an application program, short messaging service message, webpage, application programming interface, etc. The transaction request message can include at least the public key of the consumer device's blockchain wallet and a transaction amount for the desired transaction. In some cases, the transaction request message can further include an identifier that indicates the blockchain on which the transaction is being requested and/or an identifier that indicates the currency for which the transaction is being requested. In some instances, the merchant system 108 may request a currency different from the currency owned by the consumer device 102 that is locked in the currency pool. In such an instance, the transaction request message can identify both currencies.

The transaction request message can be received by the inquisitor system 110. The inquisitor system 110 can be a computing system, such as those illustrated in FIGS. 2 and 5 and discussed in more detail below, that is configured to facilitate a relationship between consumer devices 102 and liquidity providers 112. The inquisitor system 110 can identify the blockchain wallet associated with the consumer device 102 using the public key included in the transaction request message and then validate that the blockchain wallet can cover the transaction amount that is included in the transaction request message. The inquisitor system 110 can identify transactions in the blockchain involving the consumer device 102 and, based on the sending and receiving in the transactions, determine the amount of cryptocurrency owned by the consumer device 102. If the consumer device 102 does not have ownership of a suitable amount of cryptocurrency, the inquisitor system 110 can deny the transaction and electronically transmit a notification message to the consumer device 102 indicating as much using a suitable communication network and method.

If the inquisitor system 110 determines that the consumer device 102 owns enough cryptocurrency to cover the desired transaction with the merchant system 108, then the inquisitor system 110 can forward the transaction request message to a liquidity provider 112. The liquidity provider 112 can be a computing system, such as those illustrated in FIGS. 2 and 5 and discussed in more detail below, associated with an entity that is willing to transact with merchant systems 108 on behalf of consumer devices 102 using unlocked cryptocurrency in exchange for the consumer device's locked cryptocurrency once made available. In some cases, the liquidity provider 112 can charge a fee for the services, such as by charging the consumer device 102 an additional percentage of the desired transaction amount.

In some embodiments, the inquisitor system 110 and liquidity provider 112 can be a single computing system. In such embodiments, any actions performed by the inquisitor system 110 and liquidity provider 112 discussed herein can be performed by the single computing system. In other embodiments, the inquisitor system 110 and the liquidity provider 112 can be separate and distinct computing systems. In some embodiments, the system 100 can include multiple liquidity providers 112. In such embodiments, the inquisitor system 110 can identify a liquidity provider 112 based on criteria set by the consumer device 102, merchant system 108, and/or liquidity provider 112, such as the desired currency, transaction amount, associated fees, etc. For instance, different liquidity providers 112 can charge different fees based on the transaction amount, where the consumer device 102 can be interested in the liquidity provider 112 with the lowest fee for the desired transaction amount.

Once a liquidity provider 112 receives a transaction request message, the liquidity provider 112 can determine if it wants to authorize the requested blockchain transaction. For instance, the liquidity provider 112 can confirm the desired transaction amount and its availability of the requested cryptocurrency and authorize the transaction if suitable. In some cases, the liquidity provider 112 can validate the identities of one or more of the entities involved in the requested transaction, such as discussed in more detail below. If authorized, the liquidity provider 112 can generate a smart contract to be added to the blockchain. The smart contract can be configured to, upon execution, add a new blockchain transaction to the blockchain for transfer of the requested transaction amount from a blockchain wallet associated with the liquidity provider 112 to a desired blockchain wallet of the merchant system 108. The smart contract can include a destination address associated with the blockchain wallet of the merchant system 108, which can be provided by the merchant system 108 to the consumer device 102 (e.g., and included in the original transaction request message), to the inquisitor system 110 (e.g., as part of the validation of the transaction request message), or to the liquidity provider 112 (e.g., upon request by the liquidity provider 112).

The liquidity provider 112 can electronically transmit the smart contract to a blockchain node 106 in the blockchain network 104, which can confirm the smart contract and include the smart contract in a new block that is generated, validated, and added to the blockchain. The smart contract can then be executed, which will result in the merchant system 108 receiving the desired transaction amount of cryptocurrency from the liquidity provider 112 on behalf of the consumer device 102. The merchant system 108 can then finalize the transaction with the user of the consumer device 102, such as by providing the purchased goods and/or services to the user. The result is a real-time transaction between the user and the merchant that leverages the user's locked cryptocurrency while enabling the user to receive its purchased product(s) immediately and enables the merchant to receive its cryptocurrency immediately.

For settlement, another blockchain transaction can be added to the blockchain for transfer of the transaction amount, plus any additional fees, from the consumer device 102 to the liquidity provider 112 once the consumer device's locked cryptocurrency is made available for transfer. In some cases, the smart contract generated by the liquidity provider 112 can be configured to automatically submit such a transaction to the blockchain upon unlocking of the locked cryptocurrency. In such cases, the inquisitor system 110 can be aware of locked cryptocurrency that has been leveraged for real-time transactions using the methods discussed herein when validating the consumer device's ownership of cryptocurrency, to prevent double spend of the locked cryptocurrency.

In some embodiments, one or more of the entities in the system 100 can be configured to verify the identity of another entity as part of the processes discussed herein. For example, when submitting the transaction request message, the consumer device 102 can digitally sign the transaction request message using the private key of its blockchain wallet. The inquisitor system 110 and/or liquidity provider 112 can validate the digital signature using the included public key, to validate that the consumer device 102 that submitted the transaction request message is the actual owner of the blockchain wallet. Similarly, the merchant system 108 can validate the identity of the consumer device 102 in the same manner before providing a destination address. In some cases, the merchant system 108 can digitally sign its destination address using its own private key, where the digital signature can be validated using a public key made available by the merchant system 108 (e.g., which could also be used to generate the destination address by the consumer device 102, inquisitor system 110, or liquidity provider 112). In such cases, the consumer device 102 can validate the merchant system's identity before submitting the transaction request message to ensure payment is being made to the correct merchant, and/or the liquidity provider 112 can validate the merchant's identity before generating the smart contract to ensure proper payment.

The methods and systems discussed herein provide for a transaction on a blockchain or other distributed ledger that leverages cryptocurrency locked in a liquidity pool to make a real-time transaction with a payee by a liquidity provider 112 on behalf of a consumer device 102. The result is that a user of a consumer device 102 can very easily and efficiently spend their locked cryptocurrency without having to wait for exit times or utilize complicated borrowing processes. Therefore, the methods and systems discussed herein provide significant improvements over existing methods by the use of a new system architecture and electronic communications that provider greater convenience to consumers and merchants.

Computing System

FIG. 2 illustrates an embodiment of a computing system 200. It will be apparent to persons having skill in the relevant art that the embodiment of the computing system 200 illustrated in FIG. 2 is provided as illustration only and cannot be exhaustive to all possible configurations of the computing system 200 suitable for performing the functions as discussed herein. For example, the computer system 500 illustrated in FIG. 5 and discussed in more detail below can be a suitable configuration of the computing system 200. In some cases, additional components of the system 100, such as the consumer device 102, blockchain nodes 106, merchant system 108, inquisitor system 110, and liquidity provider 112 can include the components illustrated in FIG. 2 and discussed below.

The computing system 200 can include a receiving device 202. The receiving device 202 can be configured to receive data over one or more networks via one or more network protocols. In some instances, the receiving device 202 can be configured to receive data from consumer devices 102, blockchain nodes 106, merchant systems 108, inquisitor systems 110, liquidity providers 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by consumer devices 102 that can be superimposed or otherwise encoded with transaction request messages, requests for public keys, requests for transaction amounts, requests for destination addresses, etc. The receiving device 202 can also be configured to receive data signals electronically transmitted by blockchain nodes 106, which can be superimposed or otherwise encoded with blockchain data including blocks, blockchain data values, digital signatures, public keys, etc. The receiving device 202 can also be configured to receive data signals electronically transmitted by merchant system 108 that can be superimposed or otherwise encoded with destination addresses, digital signatures, public keys, transaction amounts, etc. The receiving device 202 can also be configured to receive data signals electronically transmitted by inquisitor systems 110, which can be superimposed or otherwise encoded with transaction request messages, digital signatures, requests for blockchain data, etc. The receiving device 202 can also be configured to receive data signals electronically transmitted by liquidity providers 112 that can be superimposed or otherwise encoded with smart contracts, blockchain transactions, digital signatures, requests for destination addresses, requests for public keys, etc.

The computing system 200 can also include a communication module 204. The communication module 204 can be configured to transmit data between modules, engines, databases, memories, and other components of the computing system 200 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing system 200 and external components of the computing system 200, such as externally connected databases, display devices, input devices, etc. The computing system 200 can also include a processing device. The processing device can be configured to perform the functions of the computing system 200 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, verification module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing system 200 can also include blockchain data 206, which can be stored in a memory 214 or stored in a separate area within the computing system 200 or accessible thereby. The blockchain data 206 can include a blockchain, which may be comprised of a plurality of blocks and be associated with the blockchain network 104. In some cases, the blockchain data 206 can further include any other data associated with the blockchain and management and performance thereof, such as block generation algorithms, digital signature generation and confirmation algorithms, communication data for blockchain nodes 106, smart contracts, etc. The blockchain data 206 can also include data used by the computing system 200 for actions associated with a blockchain, such as cryptographic key pairs for blockchain wallets, public keys for generating destination addresses or validating digital signatures, transaction histories, cryptocurrency amounts, currency pool data, etc.

The computing system 200 can also include a memory 214. The memory 214 can be configured to store data for use by the computing system 200 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing system 200 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, transaction request message formatting rules, currency identifiers, network identifiers, fee data, currency conversion rules and algorithms, etc.

The computing system 200 can include a querying module 216. The querying module 216 can be configured to execute queries on databases to identify information. The querying module 216 can receive one or more data values or query strings and can execute a query string based thereon on an indicated database, such as the blockchain data 206 of the computing system 200 to identify information stored therein. The querying module 216 can then output the identified information to an appropriate engine or module of the computing system 200 as necessary. The querying module 216 can, for example, execute a query on the memory 214 to identify identifiers for inclusion in a transaction request message to be submitted to an inquisitor system 110.

The computing system 200 can also include a generation module 218. The generation module 218 can be configured to generate data for use by the computing system 200 in performing the functions discussed herein. The generation module 218 can receive instructions as input, can generate data based on the instructions, and can output the generated data to one or more modules of the computing system 200. For example, the generation module 218 can be configured to generate data messages, recommendation messages, transaction request messages, etc. The generation module 218 can also be configured to generate smart contracts, which can be configured to add new blockchain transactions to the blockchain upon execution, such as for a real-time transfer of cryptocurrency between liquidity providers 112 and merchant systems 108 and the transfer of cryptocurrency between consumer devices 102 and liquidity providers 112 when locked cryptocurrency is unlocked.

The computing system 200 can also include a verification module 220. The verification module 220 can be configured to perform verifications for the computing system 200 as part of the functions discussed herein. The verification module 220 can receive instructions as input, which can also include data to be used in performing a verification, can perform a verification as requested, and can output a result of the verification to another module or engine of the computing system 200. The verification module 220 can, for example, be configured to verify digital signatures using suitable signature generation algorithms and keys, verify hash values by hashing supplied data using a suitable one-way hashing algorithm, verify available cryptocurrency amounts based on blockchain data values, verify fee amounts, verify requested criteria for liquidity providers 112 and/or consumer devices 102, etc.

The computing system 200 can also include a transmitting device 222. The transmitting device 222 can be configured to transmit data over one or more networks via one or more network protocols. In some instances, the transmitting device 222 can be configured to transmit data to consumer devices 102, blockchain nodes 106, merchant systems 108, inquisitor systems 110, liquidity providers 112, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to consumer devices 102 that are superimposed or otherwise encoded with notification messages, requests for digital signatures, requests for public keys, fee calculations, proposed liquidity providers 112, etc. The transmitting device 222 can also be configured to electronically transmit data signals to blockchain nodes 106, which can be superimposed or otherwise encoded with blockchain transactions, smart contracts, blocks, blockchain data values, requests for blockchain data, public keys, digital signatures, etc. The transmitting device 222 can also be configured to electronically transmit data signals to merchant systems 108 that can be superimposed or otherwise encoded with transaction proposals, requests for digital signatures, requests for public keys, requests for destination addresses, transaction notification messages, etc. The transmitting device 222 can also be configured to electronically transmit data signals to inquisitor systems 110, which can be superimposed or otherwise encoded with transaction request messages, digital signatures, blockchain data, etc. The transmitting device 222 can also be configured to electronically transmit data signals to liquidity providers 112, which can be superimposed or otherwise encoded with transaction request messages, digital signatures, destination addresses, transaction amounts, blockchain data, etc.

Process for Real-Time Transactions Using Locked Cryptocurrency

Figure 3:
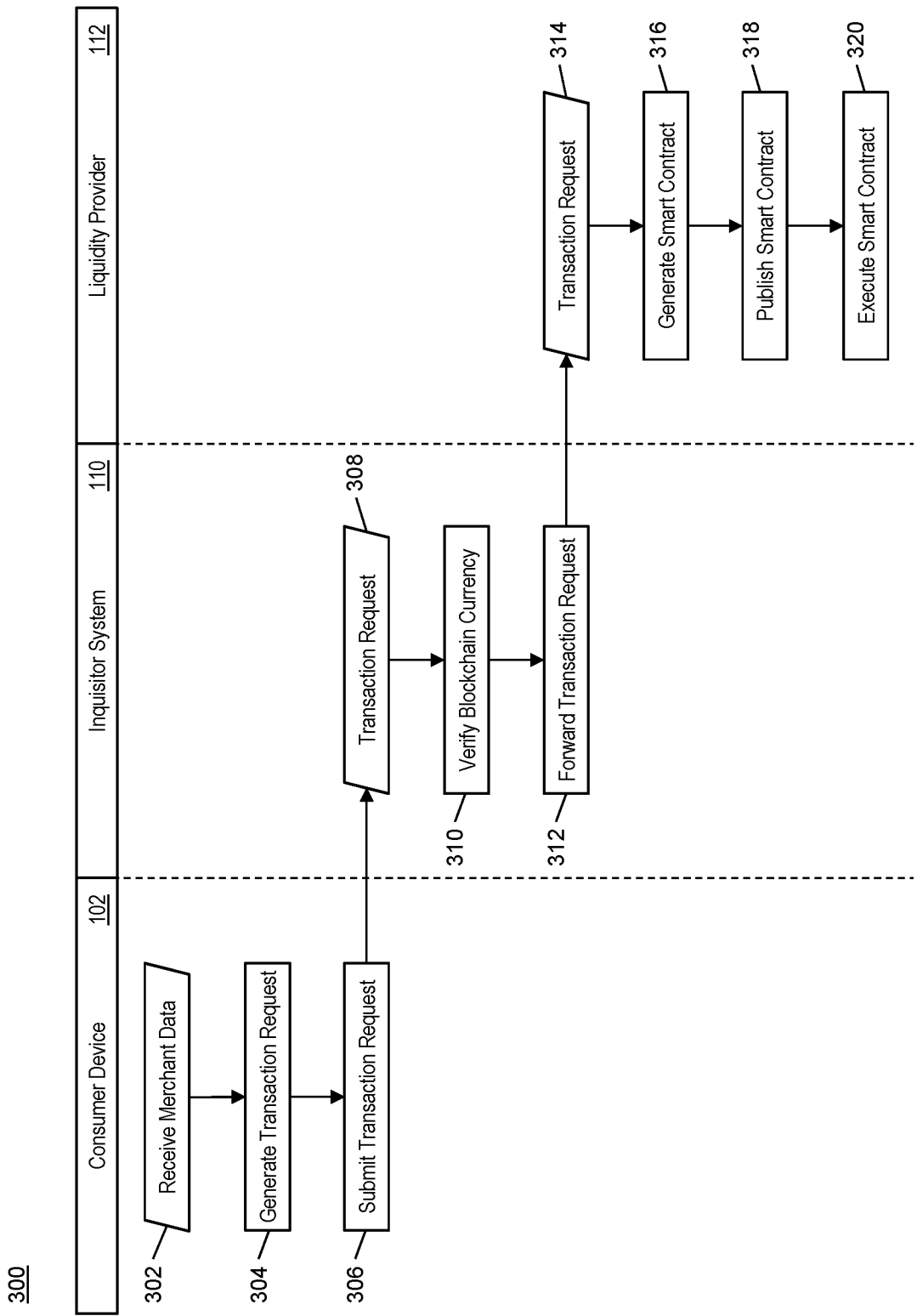
FIG. 3 is a flow diagram illustrating a process for enabling real-time authorization of a transaction with pooled equity in the system of FIG. 1 in accordance with exemplary embodiments.

FIG. 3 illustrates a process 300 for the performing of a real-time cryptocurrency transaction in the system 100 that leverages locked cryptocurrency of a consumer device 102 using a liquidity provider 112.

In step 302, the consumer device 102 can receive (e.g., by a receiving device 202 via a merchant system 108) merchant data, which can include a destination address for a blockchain wallet to be used by the merchant for receiving cryptocurrency, a transaction amount, such as the amount to be charged for the purchase of goods or services via the desired transaction, and a currency identifier for the cryptocurrency the merchant wants to receive in the desired transaction. In step 304, the consumer device 102 can generate (e.g., via a generation module 218) a transaction request message. The transaction request message can include the destination address, transaction amount, a public key of the consumer device's blockchain wallet, a first currency identifier for the locked cryptocurrency to be used by the consumer device 102, and a second currency identifier for the cryptocurrency to be received by the merchant system 108.

In step 306, the consumer device 102 can transmit (e.g., via a transmitting device 222) the transaction request message to the inquisitor system 110 using a suitable communication network and method. In step 308, the inquisitor system 110 can receive (e.g., via a receiving device 202) the transaction request message. In step 310, the inquisitor system 110 can verify (e.g., via a verification module 220) the amount of cryptocurrency owned by the consumer device 102 to ensure that it can cover the desired transaction amount. The inquisitor system 110 can, for example, review blockchain data entries on the blockchain that involve the consumer device 102 as a payer or payee and calculate the amount of cryptocurrency still owned. In cases where the transaction request message includes a currency identifier for the locked cryptocurrency to be used by the consumer device 102, the inquisitor system 110 can verify that the amount of that specific cryptocurrency owned by the consumer device 102 is greater than the transaction amount (e.g., and any additional fees that can be incurred in the process).

If the verification is successful, then, in step 312, the inquisitor system 110 can forward (e.g., via transmitting device 222) the transaction request message to the liquidity provider 112 using a suitable communication network and method. In step 314, the liquidity provider 112 can receive (e.g., via receiving device 202) the transaction request message. The liquidity provider 112 can analyze the data included in the transaction request message and, in step 316, generate (e.g., via a generation module 218) a smart contract. The smart contract can be configured to add a new blockchain transaction to the blockchain that transfers the transaction amount of the currency associated with the second currency identifier to the destination address associated with the merchant system 108 from a blockchain wallet of the liquidity provider 112. The smart contract can also be configured to automatically add a blockchain transaction that transfers the transaction amount (plus any additional fees) of the currency associated with the first currency identifier from the consumer device 102 to the liquidity provider 112 when the currency is unlocked from its liquidity pool. In step 318, the liquidity provider 112 can have the smart contract published on the blockchain by transmitting (e.g., via a transmitting device 222) the generated smart contract to a blockchain node 106 in the blockchain network 104. The blockchain node 106 can include the smart contract in a new block that is confirmed and added to the blockchain. In step 320, the liquidity provider 112 can execute the smart contract to initiate the transaction for payment to the merchant system 108, which can result in the merchant providing the transacted-for goods or services to the user of the consumer device 102. In some cases, the smart contract can be executed automatically once one or more criteria are met, where the smart contract can self-execute as a result of the criteria being met.

Exemplary Method for Real-Time Transactions Using Locked Cryptocurrency

Figure 4:
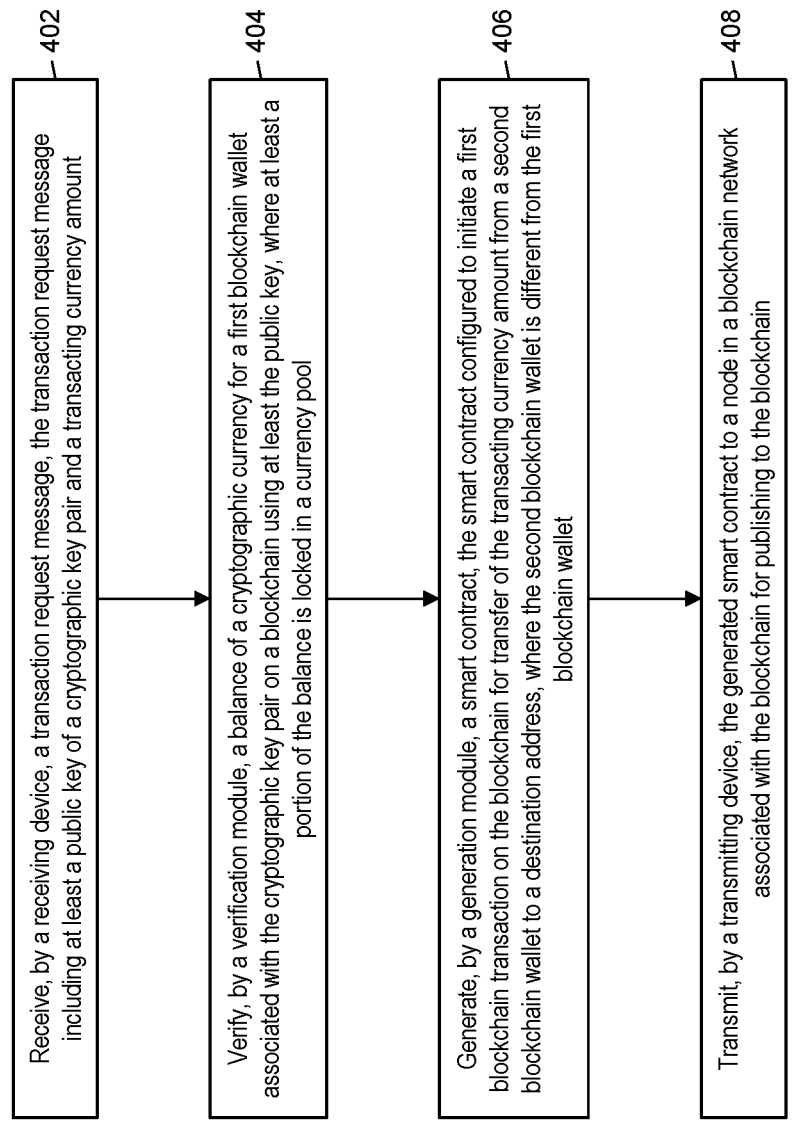
FIG. 4 is a flow chart illustrating an exemplary method for enabling real-time authorization of a transaction with pooled equity in accordance with exemplary embodiments.

FIG. 4 illustrates a method 400 for enabling real-time authorization of a blockchain transaction using pooled equity, such as cryptocurrency locked in a liquidity pool.

In step 402, a transaction request message can be received by a receiving device (e.g., receiving device 202), the transaction request message including at least a public key of a cryptographic key pair and a transacting currency amount. In step 404, a balance of a cryptographic currency for a first blockchain wallet associated with the cryptographic key pair on a blockchain can be verified by a verification module (e.g., verification module 220) using at least the public key, where at least a portion of the balance is locked in a currency pool.

In step 406, a smart contract can be generated by a generation module (e.g., generation module 218), the smart contract configured to initiate a first blockchain transaction on the blockchain for transfer of the transacting currency amount from a second blockchain wallet to a destination address, where the second blockchain wallet is different from the first blockchain wallet. In step 408, the generated smart contract can be transmitted by a transmitting device (e.g., transmitting device 222) to a node (e.g., blockchain node 106) in a blockchain network (e.g., blockchain network 104) associated with the blockchain for publishing to the blockchain.

In one embodiment, the transaction request message can further include the destination address. In some embodiments, the receiving device and the verification module can be included in a first computing system (e.g., inquisitor system 110), the generation module and the transmitting device can be in a second computing system (e.g., liquidity provider 112), and the first computing system can be distinct and separate from the second computing system. In a further embodiment, the method 400 can further include transmitting, from the first computing system to the second computing system, the transaction request message after successfully verifying of the balance.

In one embodiment, the portion of the balance locked in the currency pool can be greater than the transacting currency amount. In some embodiments, the balance for the first blockchain wallet can include a balance of a first currency type on the blockchain and a balance of a second currency type on the blockchain, and the balance of the first currency type can be the portion of the balance locked in the currency pool. In a further embodiment, the first blockchain transaction can be for transfer of the transacting currency amount of the first currency type. In an even further embodiment, the smart contract can be further configured to initiate a second blockchain transaction on the blockchain for transfer of at least the transacting currency amount of the second currency type from the first blockchain wallet to the second blockchain wallet.

Computer System Architecture

FIG. 5 illustrates a computer system 500 in which embodiments of the present disclosure, or portions thereof, can be implemented as computer-readable code. For example, the consumer device 102, blockchain node 106, merchant system 108, inquisitor system 110, and liquidity provider 112 of FIG. 1 and the computing system 200 of FIG. 2 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), lightemitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for enabling real-time authorization of a transaction with pooled equity. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for enabling real-time authorization of a transaction with pooled equity, comprising:
   receiving, by a receiving device of a first computing system, a transaction request message, the transaction request message from a consumer device of a consumer, for a transaction with a merchant system, including at least a public key of a cryptographic key pair of a first blockchain wallet associated with the consumer device and a transacting currency amount;
   verifying, by a verification module of the first computing system, a balance of a cryptographic currency for the first blockchain wallet associated with the consumer device on a blockchain using at least the public key, where at least a portion of the balance of the cryptographic currency is locked in a currency pool and will not become available until the locked balance is unlocked;
   in response to verifying the balance of the cryptographic currency, identifying, by the first computing system, a second computing system that is willing to transact with the merchant system on behalf of the consumer using unlocked cryptocurrency in exchange for locked cryptographic currency of the consumer once it is made available;
   generating, by a generation module of the second computing system, a smart contract, the smart contract configured to initiate a first blockchain transaction on the blockchain for transfer of the transacting currency amount from a second blockchain wallet associated with the second computing system to a destination address associated with a blockchain wallet of a merchant system without first requiring cryptographic currency from the consumer, where the second blockchain wallet is different from the first blockchain wallet;
   transmitting, by a transmitting device of the second computing system, the generated smart contract to a node in a blockchain network associated with the blockchain for publishing to the blockchain, and
   executing, by the node in the blockchain network, the generated smart contract received from the second computing system such that a real-time transfer of cryptocurrency is initiated by transferring the transaction currency amount from the second blockchain wallet associated with the second computing system to the destination address associated with the blockchain wallet of the merchant system without first requiring cryptographic currency from the consumer.

2. The method of claim 1, wherein the transaction request message further includes the destination address.

3. The method of claim 1, wherein
   the first computing system is an inquisitor system,
   the second computing system is a liquidity provider, and
   the first computing system is distinct and separate from the second computing system.

4. The method of claim 3, further comprising:
   transmitting, from the first computing system to the second computing system, the transaction request message after successfully verifying of the balance.

5. The method of claim 1, wherein the portion of the balance locked in the currency pool is greater than the transacting currency amount.

6. The method of claim 1, wherein
   the balance for the first blockchain wallet includes a balance of a first currency type on the blockchain and a balance of a second currency type on the blockchain, and
   the balance of the first currency type is the portion of the balance locked in the currency pool.

7. The method of claim 6, wherein the first blockchain transaction is for transfer of the transacting currency amount of the first currency type.

8. The method of claim 7, wherein the smart contract is further configured to initiate a second blockchain transaction on the blockchain for transfer of at least the transacting currency amount of the second currency type from the first blockchain wallet to the second blockchain wallet.

9. A system for enabling real-time authorization of a transaction with pooled equity, comprising:
- a blockchain network including one or more nodes;
- a first computing system;
- a second computing system; and
- a merchant system,
    wherein the first computing system includes
        a receiving device configured to receive a transaction request message from a consumer device of a consumer, for a transaction with the merchant system, the transaction request message including at least a public key of a cryptographic key pair of a first blockchain wallet associated with the consumer device and a transacting currency amount;
        a verification module configured to verify a balance of a cryptographic currency for the first blockchain wallet associated with the consumer device on a blockchain associated with the blockchain network using at least the public key, where at least a portion of the balance of the cryptographic currency is locked in a currency pool and will not become available until the locked balance is unlocked; and
        a processor configured to identify, in response to the verification module verifying the balance of the cryptographic currency, a second computing system that is willing to transact with the merchant system on behalf of the consumer using unlocked cryptocurrency in exchange for locked cryptographic currency of the consumer once it is made available;
    wherein the second computing system includes
        a generation module configured to generate a smart contract, the smart contract configured to initiate a first blockchain transaction on the blockchain for transfer of the transacting currency amount from a second blockchain wallet associated with the second computing system to a destination address associated with a blockchain wallet of the merchant system without first requiring cryptographic currency from the consumer, where the second blockchain wallet is different from the first blockchain wallet; and
        a transmitting device configured to transmit the generated smart contract to the node in the blockchain network for publishing to the blockchain, and
    wherein the node in the blockchain network is configured to execute the generated smart contract received from the second computing system such that a real-time transfer of cryptocurrency is initiated by transferring the transaction amount from the second blockchain wallet associated with the second computing system to the destination address associated with the blockchain wallet of the merchant system without first requiring cryptographic currency from the consumer.

10. The system of claim 9, wherein the transaction request message further includes the destination address.

11. The system of claim 9, wherein
the first computing system is an inquisitor system,
the second computing system is a liquidity provider, and
the first computing system is distinct and separate from the second computing system.

12. The system of claim 11, wherein the first computing system transmits the transaction request message to the second computing system after successfully verifying of the balance.

13. The system of claim 9, wherein the portion of the balance locked in the currency pool is greater than the transacting currency amount.

14. The system of claim 9, wherein
the balance for the first blockchain wallet includes a balance of a first currency type on the blockchain and a balance of a second currency type on the blockchain, and
the balance of the first currency type is the portion of the balance locked in the currency pool.

15. The system of claim 14, wherein the first blockchain transaction is for transfer of the transacting currency amount of the first currency type.

16. The system of claim 15, wherein the smart contract is further configured to initiate a second blockchain transaction on the blockchain for transfer of at least the transacting currency amount of the second currency type from the first blockchain wallet to the second blockchain wallet.

* * * * *